(12) United States Patent
Harle et al.

(10) Patent No.: US 11,110,751 B2
(45) Date of Patent: Sep. 7, 2021

(54) TIRE TREAD COMPRISING CUTOUTS OF DIFFERENT DEPTHS

(71) Applicant: COMPAGNIE GENERALE DES ETABLISSEMENTS MICHELIN, Clermont-Ferrand (FR)

(72) Inventors: François Harle, Clermont-Ferrand (FR); Franck Nugier, Clermont-Ferrand (FR); Olivier Spinnler, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 508 days.

(21) Appl. No.: 16/095,558

(22) PCT Filed: Apr. 24, 2017

(86) PCT No.: PCT/FR2017/050966
§ 371 (c)(1),
(2) Date: Oct. 22, 2018

(87) PCT Pub. No.: WO2017/182762
PCT Pub. Date: Oct. 26, 2017

(65) Prior Publication Data
US 2019/0126688 A1    May 2, 2019

(30) Foreign Application Priority Data

Apr. 22, 2016 (FR) ...................................... 1653592

(51) Int. Cl.
| B60C 11/12 | (2006.01) |
| B60C 11/03 | (2006.01) |
| B60C 11/00 | (2006.01) |

(52) U.S. Cl.
CPC ........ B60C 11/0306 (2013.01); B60C 11/005 (2013.01); B60C 11/0318 (2013.01);
(Continued)

(58) Field of Classification Search
CPC . B60C 11/1236; B60C 11/1259; B60C 11/13; B60C 2011/1268; B60C 2011/036;
(Continued)

(56) References Cited

U.S. PATENT DOCUMENTS

| 3,411,559 A | 11/1968 | Verdier |
| 4,934,424 A | 6/1990 | Kojima |

(Continued)

FOREIGN PATENT DOCUMENTS

| DE | 10 2008 015 978 | 10/2008 |
| EP | 0 882 606 | 12/1998 |

(Continued)

*Primary Examiner* — Robert C Dye
(74) *Attorney, Agent, or Firm* — Cozen O'Connor

(57) ABSTRACT

Tread (1) of a tire for an off-road vehicle, with total width (W) and total thickness of wearable material at least equal to 60 mm. The tread is delimited axially by shoulder regions (5) provided with grooves (7). This tread (1) comprises, in central region (6), narrow groove (61) and, between each shoulder region (5) and the central region (6), an intermediate region (4) in which there are formed a plurality of oblique or transverse narrow grooves (411, 412). Narrow groove (61) of the central part is made up of first narrow-groove parts (611) of depth (P1) and of second narrow-groove parts (612) of depth (P2). Depth (P1) is greater than depth (P2). Narrow grooves (411, 412) of one same intermediate region comprise, in the circumferential direction, an alternation of narrow grooves (411) of first depth (P11) and of narrow grooves (412) of second depth (P22).

9 Claims, 2 Drawing Sheets

(52) U.S. Cl.
CPC ........... *B60C 11/12* (2013.01); *B60C 11/1236* (2013.01); *B60C 2011/036* (2013.01); *B60C 2011/0341* (2013.01); *B60C 2011/0344* (2013.01); *B60C 2011/0346* (2013.01); *B60C 2011/0348* (2013.01); *B60C 2011/0355* (2013.01); *B60C 2011/0358* (2013.01); *B60C 2011/0367* (2013.01); *B60C 2011/0369* (2013.01); *B60C 2011/0372* (2013.01); *B60C 2011/1209* (2013.01); *B60C 2011/1268* (2013.01); *B60C 2200/065* (2013.01)

(58) Field of Classification Search
CPC ..... B60C 2011/0369; B60C 2011/0348; B60C 2011/0346
See application file for complete search history.

(56) References Cited

U.S. PATENT DOCUMENTS

| | | | |
|---|---|---|---|
| 6,408,911 B1 | 6/2002 | Tanabe et al. | |
| 2003/0226629 A1 | 12/2003 | Kimishima | |
| 2008/0236714 A1 | 10/2008 | Kojima | |
| 2011/0162770 A1 | 7/2011 | Yamakawa | |
| 2012/0298271 A1 | 11/2012 | Bijaoui | |
| 2013/0180638 A1 | 7/2013 | Washizuka | |
| 2013/0263988 A1* | 10/2013 | Minoli | B60C 11/13 152/209.19 |
| 2015/0059943 A1 | 3/2015 | Radulescu et al. | |
| 2017/0106701 A1 | 4/2017 | Ito | |
| 2017/0217256 A1* | 8/2017 | Hamanaka | B60C 11/13 |
| 2017/0240000 A1* | 8/2017 | Manabe | B60C 11/11 |

FOREIGN PATENT DOCUMENTS

| | | |
|---|---|---|
| EP | 1 361 075 | 11/2003 |
| EP | 2 335 947 | 9/2009 |
| EP | 2 394 824 | 12/2011 |
| EP | 3 156 261 | 4/2017 |
| FR | 1 452 048 | 2/1966 |
| FR | 2 952 855 | 11/2009 |
| FR | 2 989 031 | 4/2012 |
| JP | S63 130302 | 8/1988 |
| JP | 2013 144526 | 7/2013 |
| WO | WO 2010/133940 | 11/2010 |

* cited by examiner

TIRE TREAD COMPRISING CUTOUTS OF DIFFERENT DEPTHS

RELATED APPLICATIONS

This is a U.S. National Phase Application under 35 USC 371 of International Application PCT/FR2017/050966 filed on Apr. 24, 2017.

This application claims the priority of French application no. 1653592 filed Apr. 22, 2016, the entire content of which is hereby incorporated by reference.

FIELD OF THE INVENTION

The present invention relates to tires for civil engineering work vehicles and notably to the tread pattern designs of these tires.

BACKGROUND OF THE INVENTION

In order to ensure satisfactory grip, in traction and braking, it is necessary to form a pattern in a tire tread, this pattern comprising a fairly complex collection of cuts and cavities. These cuts and cavities form a tread pattern design both on the surface referred to as the tread surface which is intended to come into contact with the ground, and within the thickness of the tread.

The creation, in a tread, of wide cuts (referred to as "grooves") and of narrow cuts (referred to as "sipes" or "narrow grooves") is known, notably from patent document FR 1452048. A sipe or a narrow groove has a width suited to allowing the opposing walls that delimit it to come at least partially into contact with one another when the groove enters the contact patch in which the tire is in contact with the roadway. Thus, it is possible to benefit from the presence of edge corners formed at the intersection between the cuts and a tread surface while at the same time keeping the tread sufficiently stiff when its opposing walls are at least partially in contact with one another. In the case of a groove, the walls of this groove cannot come into contact with one another under normal running conditions.

The treads of tires intended for civil engineering vehicles generally have great thicknesses of wearing material, which means to say thicknesses of at least 60 mm, which makes them markedly different from the treads of other tires and notably of tires for heavy goods vehicles. In addition, the nature of the ground over which these tires run generates specific stress loadings which can be particularly harsh, notably because of the presence of stones and other objects. Under the recommended conditions of use, these great thicknesses may generate increases in temperature as a result of the cyclic deformations brought about by running. In order to obtain good performance over the course of time it is necessary to reduce this operating temperature, at least when the tread is new, by increasing the ventilation of those tread regions that are most likely to experience high increases in temperature.

For certain uses, it is common practice to fit the new tires at the front of a vehicle and then, when the degree of wear has reached a preset limit, to fit these same worn tires on a rear axle. Thus, identical tires can be used on the axles of the one same vehicle.

The following documents are cited as documents of the prior art: FR 2989031 A1, EP 2394824 B1; these documents may help in understanding the problem stated and solved by the present invention.

Definitions:

In the present document, a radial direction means a direction which is perpendicular to the axis of rotation of the tire (this direction corresponds to the direction of the thickness of the tread).

A transverse or axial direction means a direction parallel to the axis of rotation of the tire. A direction is said to be oblique when the angle made between this direction and the axial direction is other than zero and at most equal to 60 degrees.

A circumferential direction means a direction tangential to any circle centred on the axis of rotation. This direction is perpendicular both to the axial direction and to a radial direction.

An equatorial mid-plane is a plane perpendicular to the axis of rotation and passing through the points of the tire that are radially farthest from the said axis. For a tread, this plane divides the tread widthwise into two halves of equal widths.

A block is a raised element formed on the tread, the said element being delimited by voids or grooves and comprising lateral walls and a contact face intended to come into contact with the roadway.

In the present document, a cut is a generic term referring either to a groove or to a sipe, the latter also being referred to as a narrow groove. A cut is delimited by walls of material facing one another and distant from one another by a distance (referred to as the "width of the cut").

It is precisely this distance that distinguishes a narrow groove or sipe from a wide groove; in the case of a narrow groove or sipe, this distance is appropriate for allowing the walls that delimit the narrow groove or sipe to come into at least partial contact at least when in the contact patch in contact with the roadway. In the case of a wide groove, the walls of this groove cannot come into contact with one another under normal running conditions.

A tread has a maximum thickness of material that can be worn away during running; once this maximum thickness has been reached, the tire can be replaced with a new tire, or re-treaded, which means to say provided with a new tread. The volume of material that can be worn away corresponds, for the tires of the invention, to the quantity of material situated between the tread surface when new and a virtual surface parallel to the tread surface when new and passing through the innermost points of the cuts formed in the tread.

What is meant by axially outwards is a direction directed towards the outside of the internal cavity of the tire.

A volume void ratio for a tread or part of a tread corresponds to the ratio between the total volume of voids in this tread or in this part and the total volume of the tread or of the part including the total volume of voids.

A surface void ratio for a tread or part of a tread corresponds to the ratio between the total surface-area of the voids in this tread or in this tread part and the total surface-area of the tread or of the tread part including the surface-area of the voids.

BRIEF DESCRIPTION OF THE INVENTION

One object of the present invention is to improve the grip performance of treads of high thickness, whatever their degree of wear while at the same time limiting the increase in operating temperature in the hottest regions of the tire.

To this end, one aspect of the invention is directed to a tread of a tire intended to be fitted to an off-road vehicle, this tread having a surface—referred to as the tread surface—which is intended to come into contact with the ground when the tire is running.

This tread has a total width W and a total thickness of wearable material at least equal to 60 mm and on its tread surface comprises a tread pattern generated by a plurality of cuts oriented transversely or obliquely overall and of cuts oriented circumferentially overall. These cuts of circumferential overall orientation delimit tread regions.

Shoulder regions are defined which axially delimit the tread, each shoulder region having a width comprised between 15% and 35% of the total width W of the tread and comprising a plurality of transverse or oblique grooves of depth P. These shoulder-region grooves are arranged in the circumferential direction with a mean spacing D.

A central region is defined which is centred on the equatorial mid-plane widthwise and in which region there is formed a narrow groove that occupies the entire width of this central region.

A narrow zigzag groove is formed in this central region, this narrow groove being made up of an alternation of first narrow-groove parts and of second narrow-groove parts, these first and second narrow-groove parts being connected to each other by joining regions. The circumferential distance between two joining regions within which a first groove part and a second groove part can be found is equal to the mean spacing of the shoulder-region grooves. The width of the central region is equal to the amplitude of the zigzag of the narrow groove. At the extreme, this amplitude may be zero and then the narrow groove is rectilinear in the circumferential direction.

Intermediate regions situated between each shoulder region and the central region are defined. Formed in each intermediate region are a plurality of oblique or transverse narrow grooves, which means to say grooves the mean orientation of which makes an angle at most equal to 60 degrees with the axial direction, each of these narrow grooves beginning in a joining region of the narrow groove of the central part and connecting into a transverse or oblique groove formed in one of the shoulders.

This tread is such that:

the narrow groove of the central part is made up of first narrow-groove parts of depth P1 and of second narrow-groove parts of depth P2, the depth P1 being greater than the depth P2, these depths being less than the depth P of the grooves in the shoulder parts, and that the narrow grooves of one same intermediate region comprise, in the circumferential direction, an alternation of narrow grooves of a first depth P11 and of narrow grooves of a second depth P22, these depths being less than the depth P of the grooves in the shoulder parts.

For preference, the mean spacing of the grooves in the shoulders is determined in such a way as to have at least one narrow groove of each depth P1, P2, P11, P22 in the contact patch under the recommended conditions of use.

Advantageously, the narrow groove of the central part comprises first parts of a first length S1 and second parts of a second length S2, this second length S2 being greater than the first length S1. Thus it is possible when new to favour a higher voids ratio than is desirable after partial wear that sees the narrow groove parts of least depth disappear.

Advantageously, each shoulder region is separated from the intermediate region directly contiguous with it by a narrow groove of circumferential overall orientation. A groove of circumferential overall orientation must be understood as meaning a groove that makes the full circuit of the tire, regardless as to whether or not it zigzags.

In this latest alternative form, it may be advantageous also to form a narrow groove of circumferential overall orientation between each intermediate region and the central region.

For preference, in each intermediate region, the narrow grooves make a mean angle at most equal to 45 degrees with the axial direction.

Advantageously, it is preferable for the difference between the as-new depths of the narrow grooves to be at least equal to 15% and at most equal to 70% of the maximum depth of the grooves formed on the shoulder regions of the tread.

Thus, in a first period of use of tires according to the invention (between the as-new state and partial wear representing at most 50% of the wearable thickness), the tread comprises a great many edge corners formed by all of the grooves and this is at once beneficial to obtaining good grip performance and good thermal ventilation of the tread, the closing of the narrow grooves in the contact patch preventing objects present on the ground from attacking the bottom of the grooves. In a second period of use, this same tire is fitted on a rear axle for which the requirements are not the same as at the front: the reduction in the number of edge corners is then beneficial from the standpoints of endurance and resistance to attack during running.

Advantageously, the presence of suitable materials may be combined with this presence of cuts of different depths. In particular, it is advantageous to form the tread as a superposition of a first material and of a second material so that initially it is the first material that is in contact with the ground and subsequently it is the second material which comes into contact with the ground. In this preferred alternative form, the narrow groove parts of least depth P2, P22 are designed to disappear at the latest when the first material is completely worn. In this alternative form, the first material may be chosen for being a material that has good wearing performance, whereas the second material may be chosen for having better resistance to attack.

Further features and advantages of the invention will become apparent from the description given hereinafter with reference to the appended drawings which show, by way of non-limiting examples, embodiments of the subject matter of the invention.

DETAILED DESCRIPTION OF THE FIGURES

To make the figures easier to understand, identical reference signs have been used in the description of alternative forms of embodiment of the invention where these reference signs refer to elements of the same kind, whether in terms of structure or function.

Figure 1:
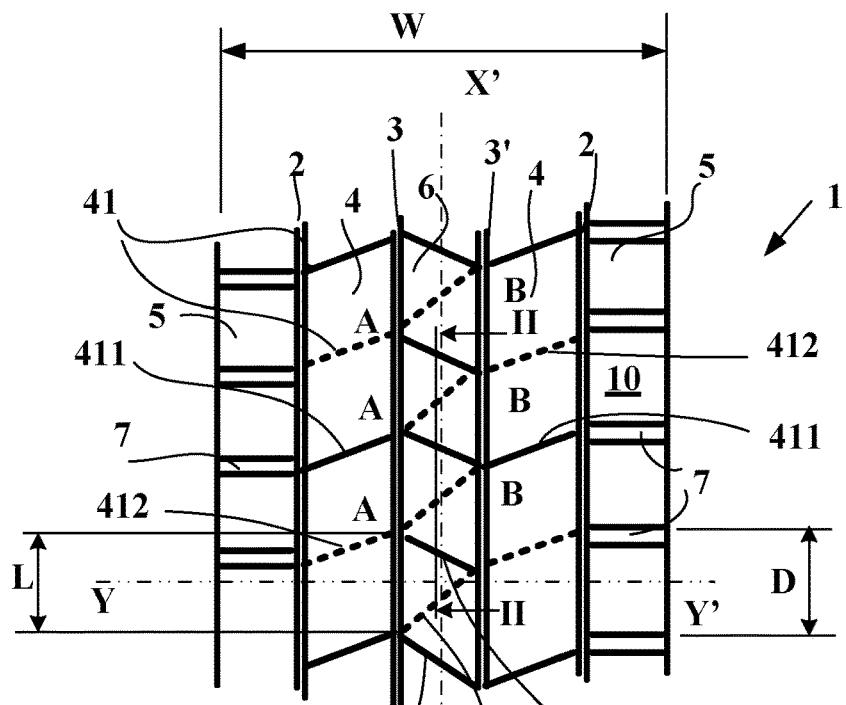
FIG. 1 depicts a partial view of the surface of a tread according to a first alternative form of the invention.

FIG. 1 depicts a partial view of the tread surface 10 of a tread 1 when new according to a first alternative form of the invention. When new, this tread, which is intended to equip a tire with a diameter of 57 inches, has a wearable thickness of material equal to 100 mm and a total width W equal to 982 mm.

According to this alternative form of a tread of a tire intended, initially, to be fitted to the front axle of a vehicle for off-road use, shoulder regions 5 can be discerned, these axially delimiting the tread, each shoulder region 5 having a width 220 mm being bordered by a narrow circumferential groove 2. In these shoulder regions 5 are formed a plurality of wide grooves 7 of width 50 mm and of depth P equal to 100 mm. These wide grooves 7 in the shoulder regions 5 are oriented transversely and arranged in the circumferential direction with a mean spacing D equal to 255 mm. These wide grooves 7, arranged with the same mean spacing on each shoulder 5, are circumferentially offset from one shoulder with respect to the other.

A central region 6 is defined, this being centred on the equatorial mid-plane and delimited in the present alternative form of embodiment by narrow circumferential grooves 3 and 3'. This central region 6 has a width equal to the amplitude of the zigzag of a narrow groove 61 occupying the entire width of this central region. In the example described, this amplitude is equal to 96 mm. The narrow grooves have a width suited to allowing their opposing walls to come into contact with one another when in the contact patch.

This narrow zigzag groove 61 is made up of an alternation of first narrow-groove parts 611 and second narrow-groove parts 612, these first and second narrow-groove parts being connected to one another by joining regions indicated by the letters A, B (the connecting regions A all being on the one same side of the equatorial mid-plane embodied by the line XX' in FIG. 1, the joining regions B all being on the other side of the said plane).

The circumferential distance L between two joining regions on the one same side of the equatorial mid-plane within which a first groove part 611 and a second groove part 612 can be found is equal to the mean spacing D of the transverse grooves 7 of the shoulder regions 5.

An intermediate region 4 of a width substantially equal to the width of the shoulder parts 5 is formed between each shoulder region 5 and the central region 6. These intermediate parts comprise a plurality of oblique narrow grooves 41, which means to say grooves the mean orientation of which makes an angle here equal to 30 degrees with the axial direction YY', each of these narrow grooves beginning in a joining region A or B of the narrow groove of the central part and connecting into a transverse or oblique groove formed on one of the shoulders.

Furthermore, the narrow groove 61 of the central part is made up of first narrow-groove parts 611 having a depth P1 equal to 80 mm and of second narrow-groove parts 612 having a depth P2 equal to 60 mm. In this example, the first and second narrow-groove parts have the one same length.

In this example, an alternation of narrow grooves 411 of a first depth P11 equal to the depth P1 of the first narrow-groove parts 611 of the central part and of narrow grooves 412 of a second depth P22 equal to the depth P2 of the second parts 612 of the groove 61 of the central part 6 is formed in each intermediate part 4.

Figure 2:
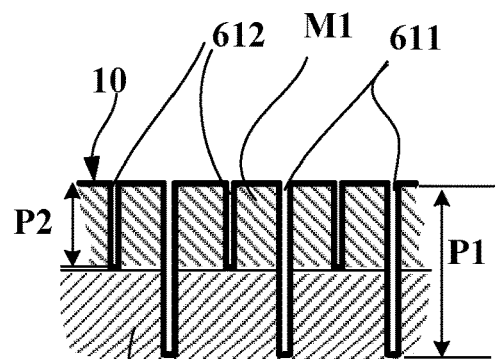
FIG. 2 depicts a view in section on a plane perpendicular to the plane of FIG. 1, and the line of which is indicated by the line II-II.

FIG. 2 shows a cross section in a plane of which the line is indicated in FIG. 1 by the line II-II.

In this alternative form of embodiment, the presence of narrow grooves of different depths is combined with the presence of two materials M1, M2 superposed within the thickness of the tread. A first material M1, chosen because it has good wearing performance, is positioned radially on the outside so that it comes into contact with the ground when the tread is new; this first material extends into a depth equal to the depth P2 of the second narrow-groove parts 612 of the central part. Radially on the inside of this first material M1 is placed a second material M2 which is chosen for its good resistance to attack.

In this preferred alternative form, the narrow groove parts of least depth P2, P22 disappear when the first material is fully worn away.

Figure 3:
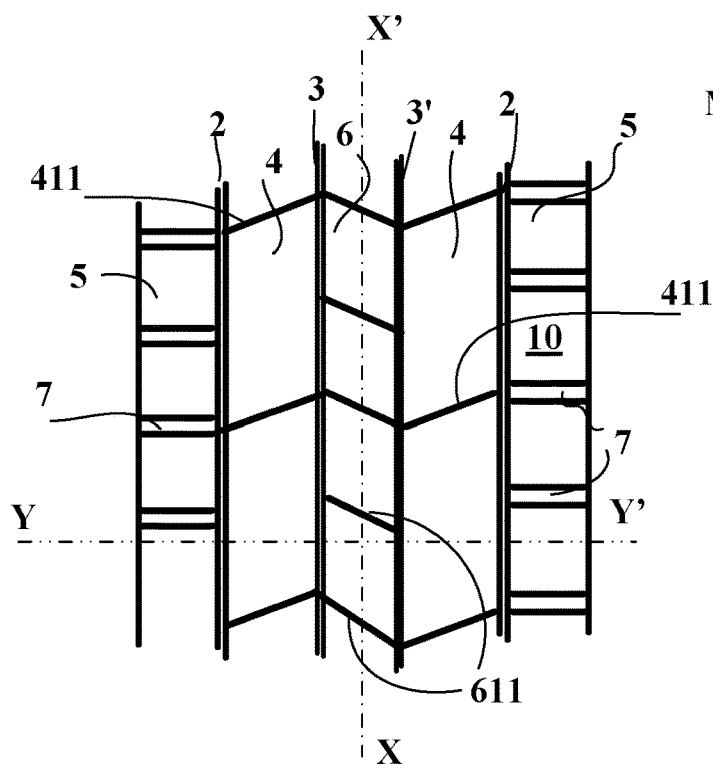
FIG. 3 shows a partial view of the surface of a tread according to the first alternative form of the invention, after partial wear.

As can be seen from FIG. 3 which shows the same tread after it has become partially worn and corresponding to the disappearance of the groove parts of least depth P2, the surface void ratio is reduced in comparison with the same ratio when new. In this configuration, in which only the narrow grooves 611, 411 that were initially the deepest remain, the tire can be fitted to a rear axle of a vehicle as the reduction in the number of narrow grooves in the central part and in the intermediate parts desensitizes the tread with respect to attack under engine torque, which attack is caused by foreign bodies present on the ground and over which the tire runs. Furthermore, the reduction in the volume of tread material appreciably reduces the level of heat during operation.

In an alternative form of embodiment not illustrated here, the narrow circumferential grooves 2, 3 delimiting the intermediate parts and the central part may be omitted right from new or alternatively may have depths smaller than the depth of the grooves in the shoulder regions so that they disappear after a predetermined amount of partial wear.

Figure 4:
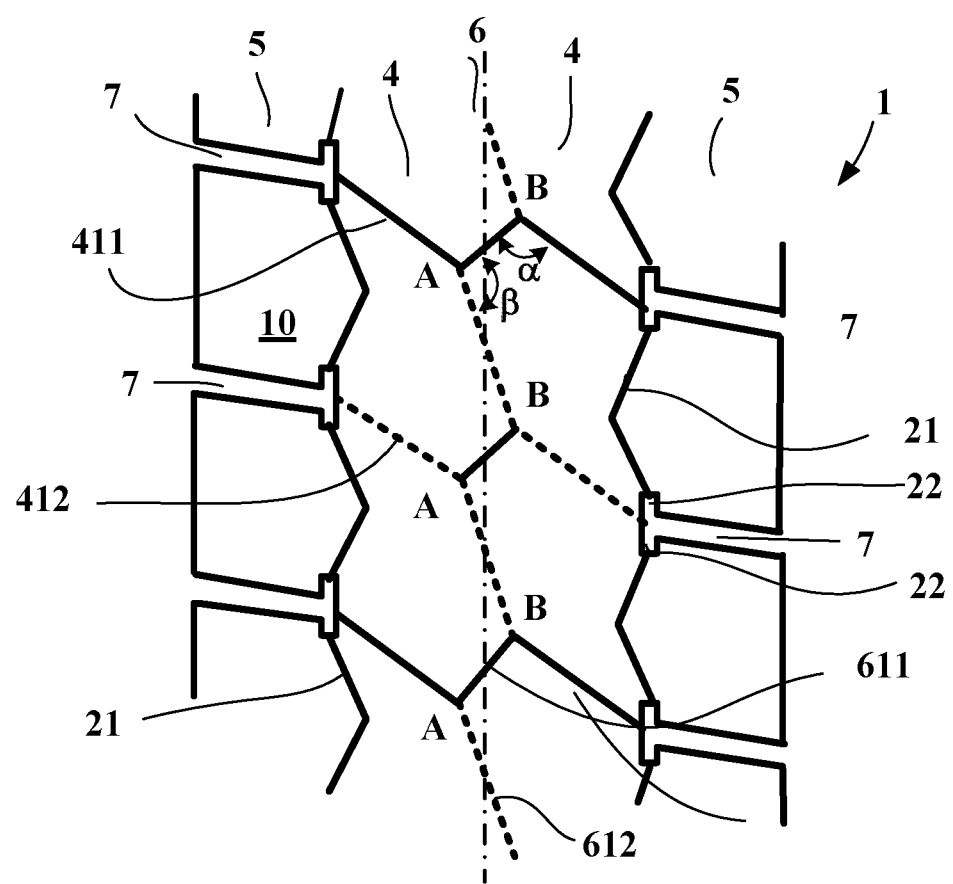
FIG. 4 shows a view of a second alternative form of embodiment of a tread according to the invention.

In another alternative form of embodiment of the invention, as shown in FIG. 4, the target is for the corner angles of the elements of material delimited by the narrow grooves to be at least equal to 90°, if not as close as possible to 90, so as to avoid weak spots when new.

FIG. 4 shows a partial view of the tread surface 10 of a tread 1 when new according to a second alternative form of the invention.

According to this alternative form of a tread of a tire intended, initially, to be fitted to the front axle of a vehicle for off-road use, shoulder regions 5 can be discerned, these axially delimiting the tread, each shoulder region 5 being bordered by a narrow circumferential groove 21 starting in wide cutouts 22 which themselves open onto oblique grooves 7. The oblique grooves 7 are circumferentially offset from one shoulder with respect to the other.

A central region 6 centred on the equatorial mid-plane comprises a narrow groove 61 comprising two parts: a first part 611 of depth P1 and a second part 612 of depth P2, these parts being connected to one another by joining regions A and B. The depth P1 is greater than the depth P2.

Furthermore, the length S1 of the groove part 611 is shorter than the length S2 of the groove part 612, while maintaining between two connecting regions AA or BB a length equal to the mean spacing of the transverse shoulder grooves. By virtue of that, it is possible to have corner angles alpha ($\alpha$) and beta ($\beta$) which are close to or greater than 90° for the tips of the elements of material delimited by the narrow grooves 411, 412, 611, 612. The angle alpha ($\alpha$) corresponds to the angle between a first groove part 611 of the central region 6 and a groove 411 or 412 of an intermediate region 4. The angle beta ($\beta$) corresponds to the angle between a first groove part 611 of the central region 6 and a second part 612 of the same central region 6.

Thanks to this arrangement in the central part, the effect in the first phase of tread wear can also be accentuated while at the same time limiting the lengths of narrow grooves after partial wear.

Furthermore, in this alternative form of embodiment, it is found that the volume void ratios of the shoulder regions and of the intermediate regions and central region differ greatly. In the shoulder regions, there is a volume void ratio when new of 20%, whereas across the rest of the tread (intermediate and central regions) the volume void ratio is equal to 6%.

The invention described here is not intended to be limited to these two examples, and various modifications can be made thereto without departing from the scope as defined by the claims. In particular, the blocks may be bounded by narrow grooves that have curved geometries.

The invention claimed is:

1. A tread of a tire adapted to be fitted to an off-road vehicle, this tread having;
   a tread surface which is adapted to come into contact with the ground when the tire is running,
   a total width and a total thickness of wearable material at least equal to 60 mm,
   this tread being delimited axially by shoulder regions, each shoulder region having a width comprised between 15% and 35% of the total width of the tread and comprising a plurality of transverse or oblique grooves of depth (P),
   said shoulder-region grooves being arranged in the circumferential direction with a mean spacing,
   the tread further comprising a central region centered on the equatorial mid-plane and having a narrow groove that occupies the entire width of said central region,
   said narrow groove comprising an alternation of first narrow-groove parts and of second narrow-groove parts, said first and second narrow-groove parts being connected to each other by joining regions, a circumferential distance between two circumferentially adjacent joining regions within which a said first narrow groove part and a said second narrow groove part are received is equal to the mean spacing of the shoulder-region grooves,
   said tread comprising, between each said shoulder region and the central region, an intermediate region in which there are formed a plurality of oblique or transverse narrow grooves the mean orientation of which makes an angle at most equal to 60 degrees with the axial direction, each of said narrow grooves beginning in a joining region of the narrow groove of the central part and connecting into a transverse or oblique groove formed in one of the shoulders,
   wherein the narrow groove of the central part is comprised of first narrow-groove parts of depth (P1) and of second narrow-groove parts of depth (P2), the depth (P1) being greater than the depth (P2), said depths (P1, P2) being less than the depth (P) of the grooves in the shoulder regions, and
   wherein the narrow grooves of one same intermediate region comprise, in the circumferential direction, an alternation of said narrow grooves of a first depth (P11) and of narrow grooves of a second depth (P22), said depths (P11, P22) being less than the depth P of the grooves in the shoulder regions.

2. The tread according to claim 1, wherein the narrow groove of the central part comprises said first narrow groove parts of a first length and of depth (P1) and said second narrow groove parts of a second length and of depth (P2) less than the depth (P1), said second length being greater than the first length.

3. The tread according to claim 1, wherein each said shoulder region is separated from the intermediate region directly contiguous with it by a narrow groove of circumferential overall orientation.

4. The tread according to claim 1, wherein a narrow groove of circumferential overall orientation is formed between each said intermediate region and the central region.

5. The tread according to claim 1, wherein, in each intermediate region, the narrow grooves make a mean angle at most equal to 45 degrees with the axial direction.

6. The tread according to claim 1, wherein the difference between the as-new depths of the narrow grooves is at least equal to 15% and at most equal to 70% of the maximum depth of the grooves formed on the shoulder regions of the tread.

7. The tread according to claim 1, comprising a first material and a second material configured so that initially the first material is in contact with the ground and subsequently, after wear of the first material, the second material comes into contact with the ground.

8. The tread according to claim 7, wherein the first material comprises a first number of edge corners formed by the grooves configured for grip performance and thermal ventilation of the tread, and wherein the second material comprises a second number of edge corners formed by the grooves, wherein the second number of edge corners is less than the first number of edge corners.

9. The tread according to claim 7, wherein the second material is resistant to attack from objects present on the ground.

* * * * *